US009794635B2

(12) United States Patent
Sumitomo et al.

(10) Patent No.: US 9,794,635 B2
(45) Date of Patent: Oct. 17, 2017

(54) DISTRIBUTION DEVICE, DISTRIBUTION METHOD, AND NON-TRANSITORY COMPUTER READABLE STORAGE MEDIUM

(71) Applicant: YAHOO JAPAN CORPORATION, Tokyo (JP)

(72) Inventors: Eiji Sumitomo, Tokyo (JP); Kanta Suzuki, Tokyo (JP); Kazutaka Kimura, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 170 days.

(21) Appl. No.: 14/325,754

(22) Filed: Jul. 8, 2014

(65) Prior Publication Data
US 2015/0089542 A1  Mar. 26, 2015

(30) Foreign Application Priority Data

Sep. 20, 2013  (JP) .................................. 2013-195681

(51) Int. Cl.
*G06F 3/00* (2006.01)
*G06F 13/00* (2006.01)
(Continued)

(52) U.S. Cl.
CPC ..... *H04N 21/482* (2013.01); *H04N 21/44008* (2013.01); *H04N 21/6587* (2013.01); *H04N 21/812* (2013.01)

(58) Field of Classification Search
CPC ............. H04N 21/482; H04N 21/4725; H04N 21/812; H04N 21/4828; H04N 21/4826;
(Continued)

(56) References Cited

U.S. PATENT DOCUMENTS

2009/0327893 A1* 12/2009 Terry .................... G06F 3/1438
715/719
2012/0123874 A1    5/2012 Park

FOREIGN PATENT DOCUMENTS

JP    2005-091719 A    4/2005
JP    2008-250857 A    10/2008
(Continued)

OTHER PUBLICATIONS

Aug. 19, 2014 Japanese Office Action issued in Application No. 2013-195681.
(Continued)

*Primary Examiner* — Nasser Goodarzi
*Assistant Examiner* — An Nguyen
(74) *Attorney, Agent, or Firm* — Oliff PLC

(57) ABSTRACT

A distribution device includes a distribution unit configured to distribute, to a user terminal, a content control program for controlling content displayed on the user terminal. The content control program causes the user terminal to execute a viewable area acquisition procedure of acquiring, as information on a viewable area, information on an area of the content displayed by a browser program, a reference position acquisition procedure of acquiring pieces of information on a plurality of reference positions defined on a display area of the content on which a video image is displayed, a determination procedure of determining whether the plurality of reference positions are located in the viewable area, and a playback start procedure of starting playback of the video image when it is determined that the plurality of reference positions are located in the viewable area.

14 Claims, 14 Drawing Sheets

(51) Int. Cl.
    *H04N 5/445*      (2011.01)
    *H04N 21/482*     (2011.01)
    *H04N 21/6587*    (2011.01)
    *H04N 21/81*      (2011.01)
    *H04N 21/44*      (2011.01)

(58) Field of Classification Search
    CPC ......... H04N 21/23412; H04N 21/2743; H04N
                    21/23106; H04N 21/2402; H04N
                    21/4821; H04N 21/25891; H04N
            21/2542; H04N 21/4532; H04N 21/4334
    USPC ....... 725/38, 19, 61, 46, 37, 43, 20, 12, 116,
                    725/109, 86, 115, 32, 153, 54
    See application file for complete search history.

(56) References Cited

FOREIGN PATENT DOCUMENTS

| JP | A-2011-128204 | 6/2011 |
|----|---------------|--------|
| JP | 2012-525624 A | 10/2012 |

OTHER PUBLICATIONS

Jan. 13, 2015 Japanese Office Action issued in Application No. 2013-195681.

\* cited by examiner

| ATTRIB-UTE 1 | ATTRIB-UTE 2 | ATTRIB-UTE 3 | ... |
|---|---|---|---|

| ADVERTISE-MENT ID | VIDEO ADVERTISEMENT DATA | REFERENCE POSITION | ADVERTISER ID |
|---|---|---|---|
| A001 | VIDEO ADVERTISEMENT 1 | $(x_{11}, y_{11}), (x_{12}, y_{12})$ | S001 |
| A102 | VIDEO ADVERTISEMENT 2 | $(x_{21}, y_{21}), (x_{22}, y_{22})$ | S102 |
| A103 | VIDEO ADVERTISEMENT 3 | $(x_{31}, y_{31}), (x_{32}, y_{32})$ | S103 |
| ⋮ | ⋮ | ⋮ | ⋮ |

FIG.7
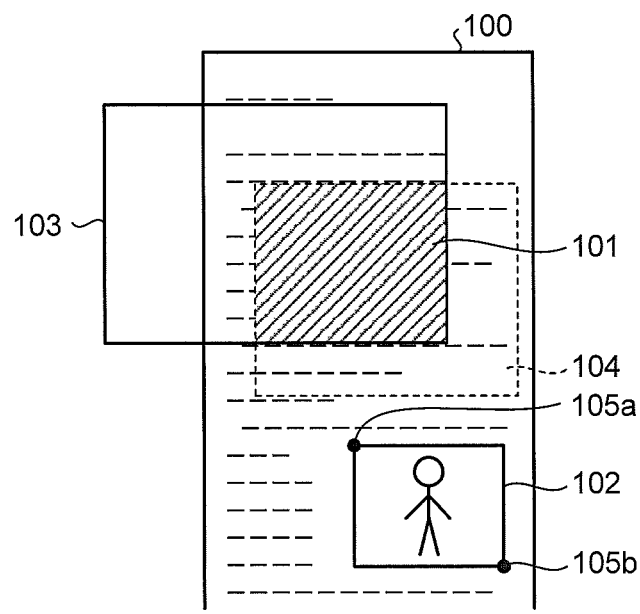
FIG.8A   FIG.8B   FIG.8C
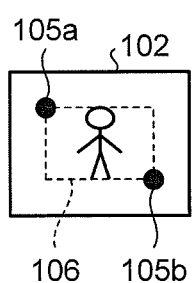 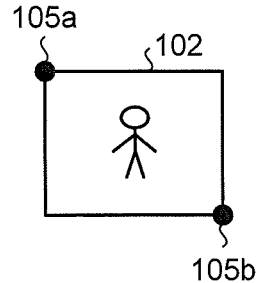 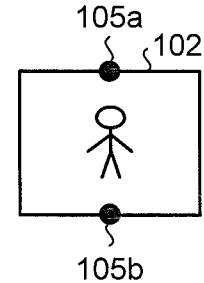

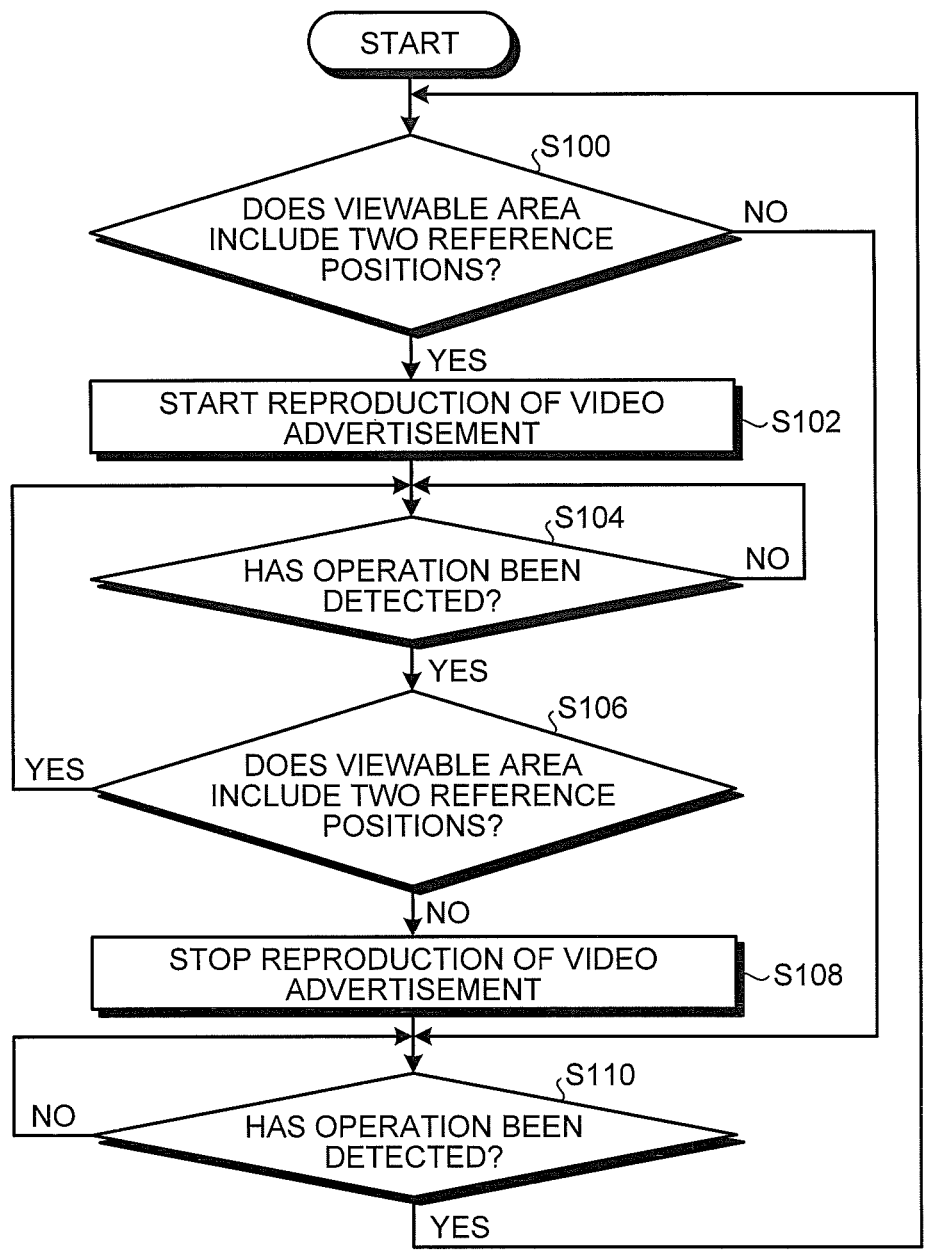

FIG.19
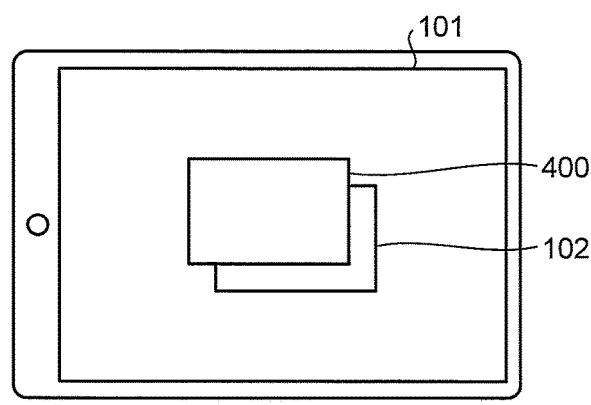
FIG.20A          FIG.20B
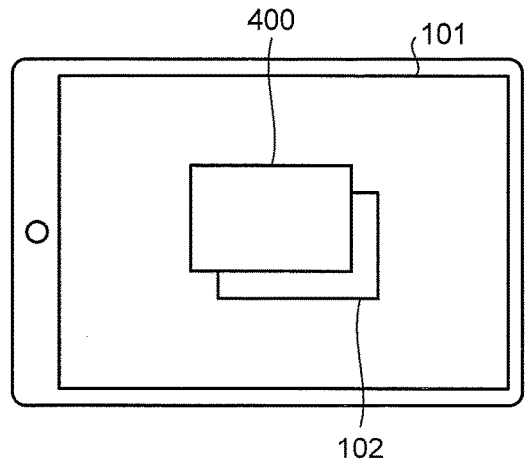     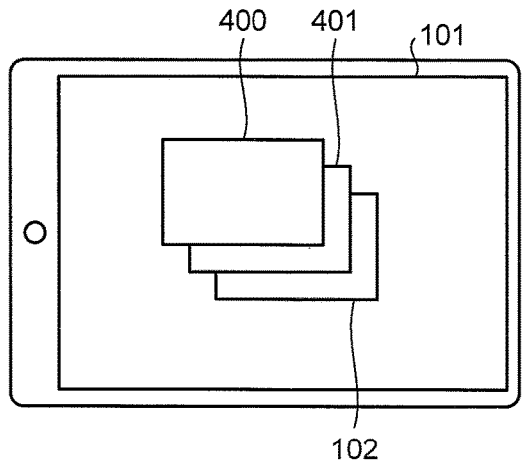

DISTRIBUTION DEVICE, DISTRIBUTION METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2013-195681 filed in Japan on Sep. 20, 2013.

BACKGROUND OF THE INVENTION

1. Field of the Invention

The present invention relates to a distribution device, a distribution method, and a distribution program.

2. Description of the Related Art

Japanese Patent Application Laid-open No. 2011-128204 discloses an advertisement distribution device that causes a video image to be reproduced on a display area for a video image when a viewable area displayed on a screen of a web browser in an area of content such as a web page includes one reference position set in the display area.

In the technique as disclosed in Japanese Patent Application Laid-open No. 2011-128204, whether a video image is reproduced on a display area is controlled using one reference position. Due to this, a timing at which the video image is reproduced is not appropriate for a user such as a browser in some cases.

SUMMARY OF THE INVENTION

It is an object of the present invention to at least partially solve the problems in the conventional technology.

According to one aspect of an embodiment, a distribution device includes a distribution unit configured to distribute a content control program for controlling a content displayed on a user terminal to the user terminal, wherein the content control program causes the user terminal to execute a viewable area acquisition procedure of acquiring, as information on a viewable area, information on an area of the content displayed by a browser program, a reference position acquisition procedure of acquiring pieces of information on a plurality of reference positions defined on a display area of the content on which a video image is displayed, a determination procedure of determining whether the plurality of reference positions are located in the viewable area, and a playback start procedure of starting playback of the video image when it is determined that the plurality of reference positions are located in the viewable area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a conceptual view for explaining an example of a viewable area;

FIGS. 8A to 8C are conceptual views for explaining an example of reference positions;

FIG. 9 is a flowchart illustrating an example of operations of the user terminal in the first embodiment;

FIG. 19 is a view illustrating an example in the case where another content is displayed on a display area 102 of a video advertisement in an overlapped manner;

FIGS. 20A and 20B are views for explaining processing when a type of reference points is changed;

DETAILED DESCRIPTION OF THE PREFERRED EMBODIMENTS

First Embodiment

The description begins with a first embodiment will be described with reference to the accompanying drawings.
Outline of Processing FIG. 1 is a conceptual view for explaining an example of outline of processing in the first embodiment.

A user terminal acquires content data distributed from a distribution device and creates a content 100 based on the acquired content data. Then, the user terminal displays the created content 100 on a screen of the user terminal. The content 100 in the embodiment includes a display area 102 for a video image and a video image is reproduced on the display area 102. In the embodiment, the video image that is reproduced in the display area 102 of the content 100 is a video advertisement, for example.

In the embodiment, the content data that is distributed to the user terminal from the distribution device includes a content control program. In the embodiment, the content 100 is a Web content, for example. The content control program is JavaScript (registered trademark), for example. The user terminal executes the content control program so as to control playback of the video advertisement in the display area 102.

Figure 1:
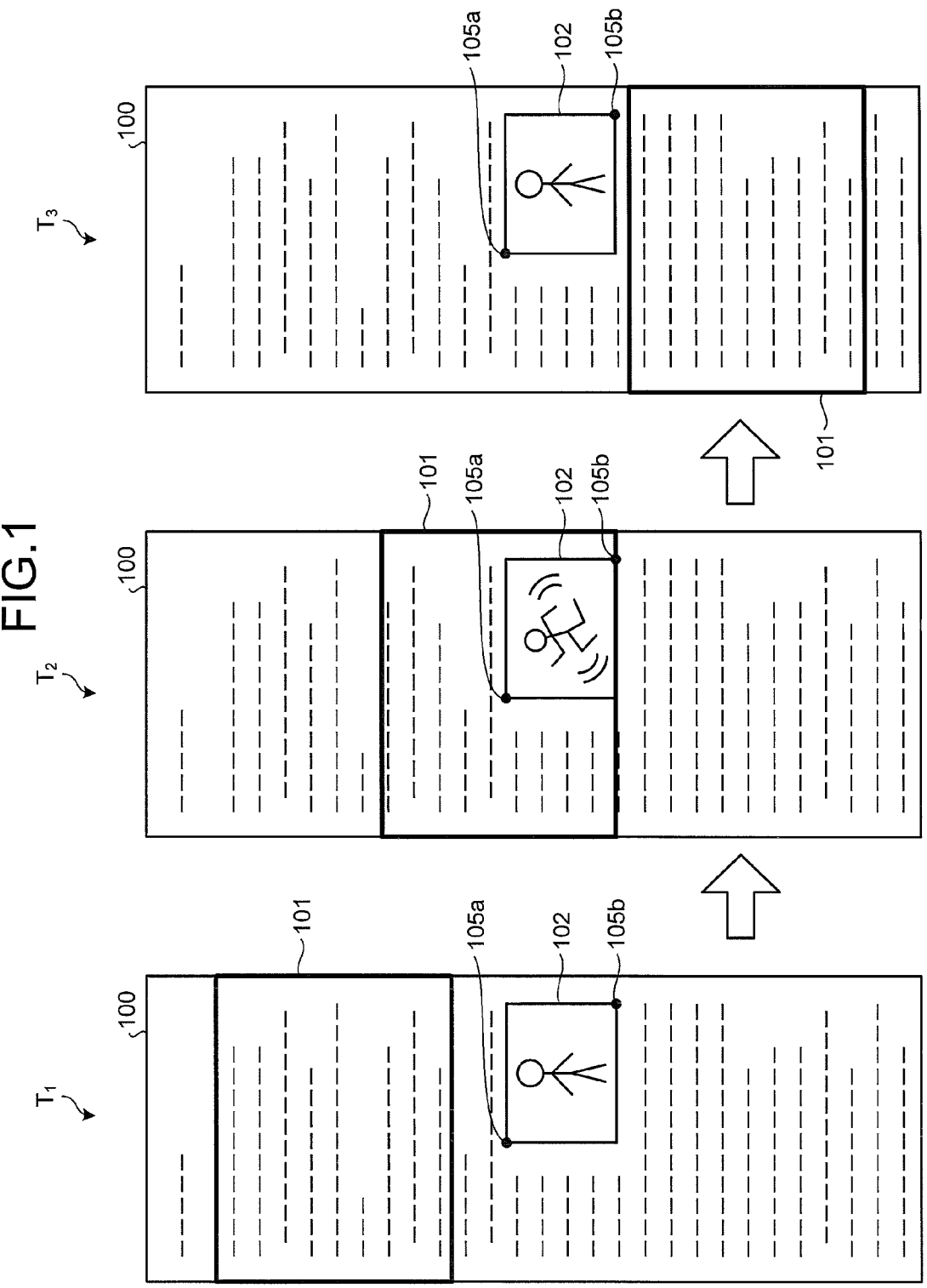
FIG. 1 is a conceptual view for explaining an example of outline of processing according to a first embodiment.

At a time $T_1$ in FIG. 1, for example, the user terminal displays an area in the content 100 on the screen of the user terminal. At this stage, the video advertisement is not reproduced on the display area 102. Hereinafter, an area displayed on a screen of the user terminal in the area of the content 100 is referred to as a viewable area 101.

When the user operates the user terminal to scroll the content 100 on the screen of the user terminal and the viewable area 101 includes a plurality of reference positions 105a and 105b that are previously defined on diagonal corners of the display area 102 of a video image in the content 100 as in a state at time $T_2$ in FIG. 1, for example, the user terminal causes the video advertisement to be reproduced in the display area 102. When the video advertisement is a video image with sound, the user terminal causes the video image to be reproduced in the display area 102 and causes the sound to be reproduced.

When the user operates the user terminal to further scroll the content 100 on the screen of the user terminal and the viewable area 101 does not include the two reference positions of the reference positions 105a and 105b as in a state at time $T_3$ in FIG. 1, for example, the user terminal stops playback of the video advertisement in the display area 102.

According to the embodiment, the video advertisement can be reproduced at a timing at which an area surrounded by a rectangular shape of which diagonal corners are at the two reference positions is desired to be viewed by a browser. In other words, according to the embodiment, the video image can be reproduced at an appropriate timing. Configurations of Distribution System 10 and Distribution Apparatus 20

Figures 2, 3:
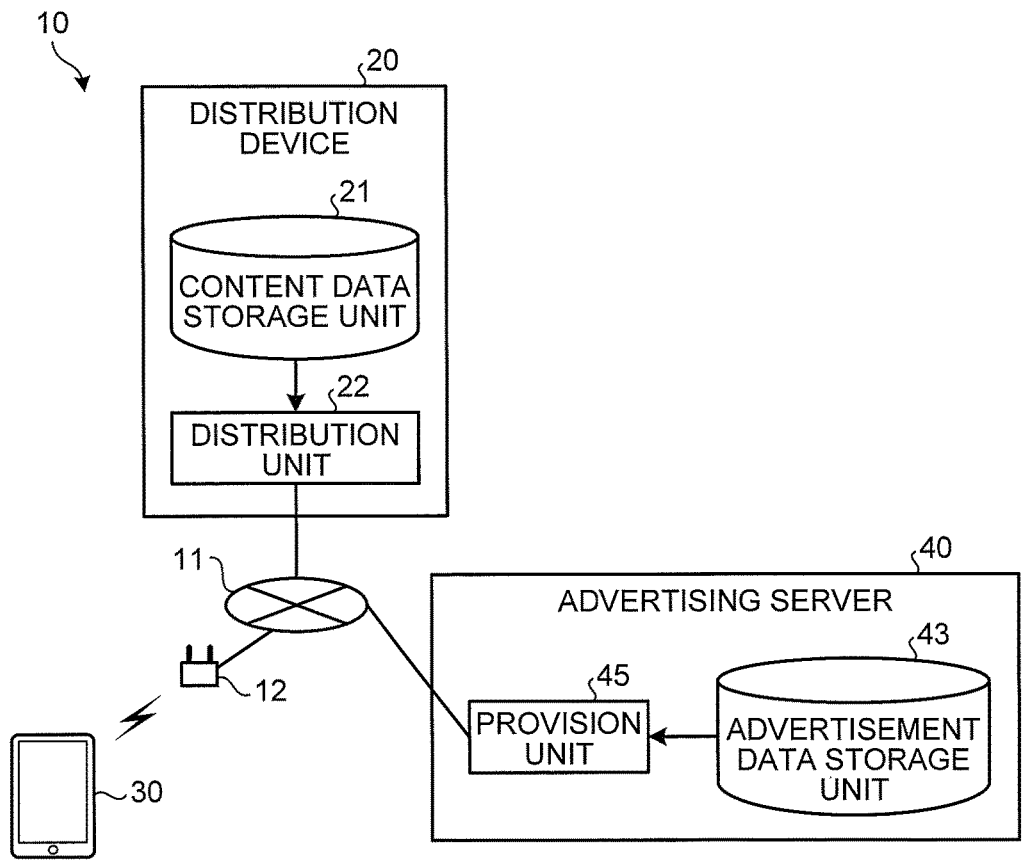
FIG. 2 is a system configuration diagram illustrating an example of a distribution system in the first embodiment.
FIG. 3 is a view illustrating an example of a data structure that is stored in a content data storage unit.

FIG. 2 is a system configuration diagram illustrating an example of a distribution system in the first embodiment. A distribution system 10 in the embodiment includes a distribution device 20, a user terminal 30, and an advertising server 40. The distribution device 20 and the advertising server 40 are connected to a communication circuit 11 and can transmit and receive communication data through the communication circuit 11.

The distribution device 20 includes a content data storage unit 21 and a distribution unit 22. FIG. 3 is a view illustrating an example of a data structure that is stored in the content data storage unit. As illustrated in FIG. 3, for example, the content data storage unit 21 stores therein pieces of content data 211 in association with URLs 210 indicating access destinations of the respective pieces of content data 211. FIG. 3 illustrates the content data storage unit 21 that stores therein the content data 211 of "content 1" in association with the URL 210 of "http://www.abcde.co.jp/xxx/" in a first record. When the distribution unit 22 receives a URL transmitted from the user terminal 30, it acquires, as content data (content data that is distributed to the user terminal 30) serving as a distribution target, the content data corresponding to the received URL from the content data storage unit 21. Subsequently, the distribution unit 22 distributes the content data serving as the distribution target to the user terminal 30.

Figures 4, 5:
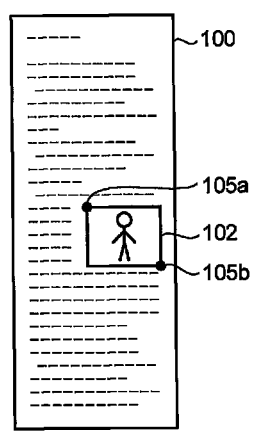
FIG. 4 is a conceptual view illustrating an example of a content structure.
FIG. 5 is a view illustrating an example of a data structure that is stored in an advertisement data storage unit.

The data structure of the content 100 in the embodiment is described. FIG. 4 is a conceptual view illustrating an example of a content structure. The content 100 in the embodiment includes the display area 102 on which a video image such as a video advertisement is reproduced and the display area 102 is associated with a video advertisement area ID indicating that it is an area for displaying the video advertisement. The content data includes information of the video advertisement area ID. In the following description, the video advertisement area ID is abbreviated to be referred to as an area ID in some cases. The plurality of reference positions 105a and 105b are defined on the display area 102 of the content 100 in the embodiment. The reference positions 105a and 105b can be previously defined on the content 100 or can be defined by an advertiser of the video advertisement that is reproduced on the display area 102.

The advertising server 40 includes an advertisement data storage unit 43 and a provision unit 45.

FIG. 5 is a view illustrating an example of a data structure that is stored in the advertisement data storage unit. As illustrated in FIG. 5, for example, the advertisement data storage unit 43 stores therein advertisement data tables for respective pieces of attribute information 430 each indicating an attribute of the user of the user terminal 30. Each advertisement data table includes pieces of video advertisement data 432, a reference position 433, and advertiser IDs 434 in association with advertisement IDs 431.

The advertisement ID is information for identifying each advertisement. The attribute information includes age, sex, nationality, and the like of the user, for example. The attribute information may include information such as specification and performance of the user terminal 30 that is used by the user additionally. The advertiser ID is information for identifying an advertiser of each advertisement. In the following description, the video advertisement data is referred to as advertisement data simply in some cases.

The reference position 433 is information that is used for determining whether playback of the video advertisement is started on the display area 102 in the content 100 and is specified by coordinates in the display area 102. Details of the reference position 433 will be described later.

FIG. 5 illustrates the advertisement data table that is associated with the attribute information 430 of "attribute 1". The advertisement data table as illustrated in FIG. 5 stores therein the video advertisement data 432 of "video advertisement 1", the reference position 433 of "$(x_{11}, y_{11})$, $(x_{12}, y_{12})$", and the advertiser ID 434 of "S001" in association with the advertisement ID 431 of "A001".

Description is continued with reference to FIG. 2 again. When the provision unit 45 receives an advertisement request having the attribute information of the user and equal to or more than one video advertisement area ID(s) from the user terminal 30 through the communication circuit 11, it extracts the advertisement ID, and the video advertisement data and the reference position associated with the advertisement ID from the advertisement data table corresponding to the attribute information included in the received advertisement request by referring to the advertisement data storage unit 43. Then, the provision unit 45 transmits the advertisement ID, the video advertisement data, and the reference position to the user terminal 30 through the communication circuit 11 for each area ID included in the advertisement request.

Configuration of User Terminal 30

Figure 6:
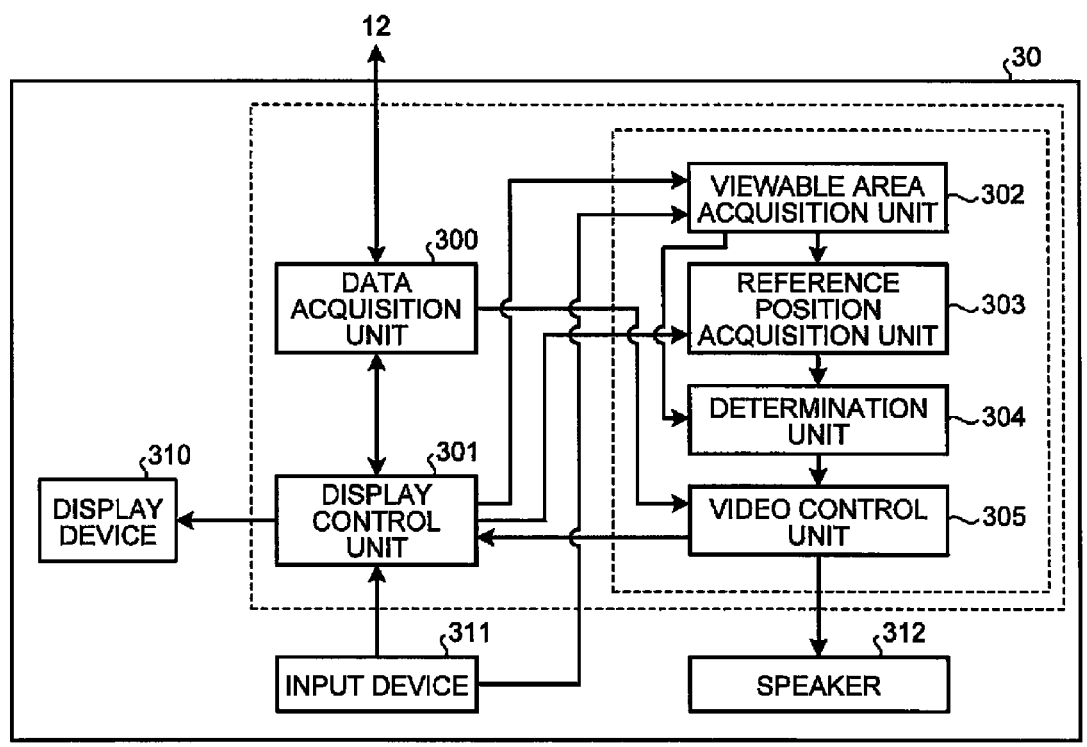
FIG. 6 is a block diagram illustrating an example of the functional configuration of a user terminal in the first embodiment.

The user terminal 30 is a mobile personal computer (PC), a personal digital assistant (PDA), a smart phone, or the like that is used by the user, and a browser application (for example, browser program) is installed on the user terminal 30. In the embodiment, a standard browser program that is installed on the user terminal 30 interprets and executes the control program such as JavaScript. Various applications capable of displaying Web contents are installed on the smart device such as the smart phone in addition thereto in some cases. These applications may interpret and execute the control program such as JavaScript so as to cause the user terminal 30 to execute functions based on the control program. FIG. 6 is a block diagram illustrating an example of the functional configuration of the user terminal in the first embodiment. The user terminal 30 in the embodiment includes a data acquisition unit 300, a display control unit 301, a viewable area acquisition unit 302, a reference position acquisition unit 303, a determination unit 304, a video control unit 305, a display device 310, an input device 311, and a speaker 312.

The browser program that is executed by an arithmetic device in the user terminal 30 causes the data acquisition unit 300, the display control unit 301, the viewable area acquisition unit 302, the reference position acquisition unit 303, the determination unit 304, and the video control unit 305 to function among the functions of the user terminal 30.

In particular, the browser program executes the content control program that is included in the content data distributed from the distribution device 20 so as to cause the viewable area acquisition unit 302, the reference position acquisition unit 303, the determination unit 304, and the video control unit 305 to function.

The data acquisition unit 300 transmits the URL of the content data to the distribution device 20 through the communication circuit 11 and acquires the content data from the distribution device 20 through the communication circuit 11. Then, the data acquisition unit 300 analyzes the acquired content data so as to extract the area ID included in the content 100 that is created.

Subsequently, the data acquisition unit 300 transmits an advertisement request including the attribute information of the user of the distribution system 10 and the extracted area ID to the advertising server 40 through the communication circuit 11. As the attribute information of the user, a HyperText Transfer Protocol cookie (HTTP cookie) that is stored in the user terminal 30 can be used.

The data acquisition unit 300 receives pieces of information on the advertisement ID, the video advertisement data, and the reference positions for each area ID from the advertising server 40 through the communication circuit 11. The data acquisition unit 300 transmits the content data and the pieces of information on the reference positions for each area ID (the area ID and the pieces of information on the reference positions corresponding to the area ID) to the display control unit 301. Furthermore, the data acquisition unit 300 transmits the advertisement ID, the video advertisement data, and the related information for each area ID (area ID, and the advertisement ID, the video advertisement data, and the related information corresponding to the area ID) to the video control unit 305.

The display control unit 301 constructs the content 100 based on the content data received from the data acquisition unit 300. The display control unit 301 transmits the pieces of information on the reference positions of the display area 102 corresponding to the video advertisement area ID to the reference position acquisition unit 303.

As for the pieces of information on the reference positions of the display area 102, the reference positions transmitted from the advertising server 40 correspond to coordinates in the display area 102. The display control unit 301 converts the coordinates in the display area 102 to coordinates in the content 100, for example, and transmits them to the reference position acquisition unit 303.

The display control unit 301 specifies a viewable area in the content 100 in accordance with an operation by the user that has been received through the input device 311 such as a touch panel. The display control unit 301 transmits image data of the content 100 included in the specified viewable area to the display device 310. When the display control unit 301 receives frame data of the reproduced video advertisement together with the area ID from the video control unit 305, the display control unit 301 performs mapping of an image of the received frame data on the display area 102 corresponding to the received area ID and transmits it to the display device 310. The display device 310 is a liquid crystal panel, for example, and displays an image based on the data received from the display control unit 301.

The viewable area is described. FIG. 7 is a conceptual view for explaining an example of the viewable area. In the embodiment, as illustrated in FIG. 7, for example, the viewable area 101 indicates an area that is included in a display area 104 of a browser and is included in a display area 103 of the screen of the user terminal 30 in the area of the content 100. Moreover, for example, for example, an area included in a display area 104 of the browser in the area of the content 100 may be set to the viewable area.

The display control unit 301 acquires positional information indicating the position and the size of the viewable area from an operating system (OS), for example. The display control unit 301 converts the positional information of the viewable area into coordinates in the content 100, for example, and manages them. In the example of FIG. 7, a shaded area corresponds to the viewable area 101.

When the viewable area acquisition unit 302 detects an operation by the user through the input device 311 such as a touch panel and a hardware switch, it acquires positional information on the viewable area from the display control unit 301. Then, the viewable area acquisition unit 302 transmits the acquired positional information on the viewable area to the determination unit 304.

When the viewable area acquisition unit 302 detects the operation by the user through the input device 311, the reference position acquisition unit 303 acquires pieces of information on the reference positions associated with the display area 102 of the video advertisement from the display control unit 301. Then, the reference position acquisition unit 303 transmits the acquired pieces of information on the reference positions to the determination unit 304.

The determination unit 304 determines whether the viewable area includes the display area 102 using the positional information on the viewable area and the reference positions associated with the display area 102 of the video advertisement based on the coordinates in the content 100, for example. In the embodiment, the determination unit 304 determines that the viewable area includes the display area 102 when the viewable area includes all the reference positions associated with the display area 102.

In the embodiment, a plurality of reference positions are associated with the display area 102 in the video advertisement. FIGS. 8A to 8C are conceptual views for explaining an example of the reference positions. As illustrated in FIG. 8A, for example, two reference positions are provided in the display area 102 in the embodiment. The coordinate values of the two reference positions 105a and 105b in both of the vertical direction and the horizontal direction in the display area 102 are different from each other.

The two reference positions having the different coordinate values in the vertical direction and the horizontal direction are provided in the display area 102 as described above. With this, even if the content 100 is scrolled in any direction, when the viewable area includes an area of a rectangular shape 106 of which diagonal corners are at the two reference positions, the determination unit 304 determines that the viewable area includes the display area 102.

When the video advertisement is reproduced in the display area 102 at a stage at which the viewable area includes the area of the rectangular shape 106 of which diagonal corners are at the two reference positions, the user terminal 30 can attract a user's attention to the video advertisement earlier in comparison with the case where the viewable area includes the entire display area 102. With this, the possibility that the user will scroll the content 100 such that the entire display area 102 is displayed in the viewable area can be increased. This can increase the opportunity that the user views the video advertisement in the display area 102.

As illustrated in FIG. 8A, when the two reference positions are arranged such that an area displaying a characteristic image on the video advertisement is surrounded by the rectangular shape 106 of which diagonal corners are at the two reference positions, the user terminal 30 can start playback of the video advertisement at the stage at which the viewable area includes the area displaying the characteristic image on the display area 102. This can further increase the opportunity that the video advertisement attracts the user's attention. An advertiser or a creator of the video advertisement knows the area displaying the characteristic image on the video advertisement in many cases. The advertiser or the like of the video advertisement data preferably registers the two reference positions together with the video advertisement data in the advertisement data storage unit 43 in the advertising server 40.

The user's attention is easier to be given when the user is made to view the entire video image in some cases depending on contents of the video advertisement. In such a case, as illustrated in FIG. 8B, for example, playback of the video image can be also started when the viewable area includes the entire display area 102 by setting the two diagonal corners of the display area 102 to the reference positions. Also in this case, even if the content 100 is scrolled in any direction, when the viewable area includes the entire display area 102, playback of the video image can be started.

When the scroll direction of the content 100 is defined to the up-down direction with respect to the display area 102, as illustrated in FIG. 8C, for example, the reference positions may be provided on sides opposing each other in the up-down direction on the frame of the display area 102. In this case, the playback of the video image can be started when the viewable area includes the entire display area 102 with the scroll in the up-down direction. When the scroll direction of the content 100 is defined to the right-left direction, it is sufficient that the reference positions are provided on sides opposing each other in the right-left direction on the frame of the display area 102.

It should be noted that the number of reference positions on one display area 102 may be equal to or more than three. When the number of reference positions is equal to or more than three, the determination unit 304 may determine that the viewable area includes the display area 102 in the case where the viewable area includes equal to or more than two reference positions in addition to the case where the viewable area includes all the reference positions. Furthermore, one reference position may be provided on one display area 102.

Description is continued with reference to FIG. 6 again. When the determination unit 304 determines that the viewable area does not include the display area 102 using the position of the viewable area and the reference positions of the display area 102, it directs the video control unit 305 to stop playback of the video advertisement.

On the other hand, when the determination unit 304 determines that the viewable area includes the display area 102, it transmits the area ID corresponding to the display area 102 to the video control unit 305.

The video control unit 305 receives the advertisement ID, the video advertisement data, and the related information for each area ID from the data acquisition unit 300, and holds them. When the video control unit 305 receives the area ID from the determination unit 304, it starts playback of the video advertisement data corresponding to the received area ID.

For example, the video control unit 305 decodes the video advertisement data and transmits frame data together with the area ID to the display control unit 301 so as to start playback of the video advertisement. When the video advertisement is a video image with sound, the video control unit 305 also decodes the sound and outputs the decoded sound through the speaker 312.

When the determination unit 304 directs the video control unit 305 to stop playback of the video advertisement, the video control unit 305 stops decoding of the video advertisement to stop the playback of the video advertisement if the playback of the video advertisement is not finished. When the video advertisement is a video image with sound, the video control unit 305 also stops decoding of the sound.

Operations of User Terminal

FIG. 9 is a flowchart illustrating an example of operations of the user terminal in the first embodiment. The user terminal 30 acquires the content data from the distribution device 20 and reads the content control program included in the acquired content data so as to start operations as illustrated in the flowchart.

First, the viewable area acquisition unit 302 acquires the positional information on the viewable area from the display control unit 301 and transmits it to the determination unit 304. The reference position acquisition unit 303 acquires pieces of information on the reference positions associated with the display area 102 of the video advertisement from the display control unit 301 and transmits them to the determination unit 304. The determination unit 304 determines whether the viewable area includes the two reference positions 105a and 105b using the positional information on the viewable area and the reference positions associated with the display area 102 of the video advertisement based on the coordinates in the content 100, for example (S100). When the viewable area does not include the two reference positions 105a and 105b (No at S100), the determination unit 304 executes processing at step S110, which will be described later.

When the viewable area includes the two reference positions 105a and 105b (Yes at S100), the determination unit 304 transmits the area ID corresponding to the display area 102 included in the viewable area to the video control unit 305. The video control unit 305 starts playback of the video advertisement data corresponding to the area ID received from the determination unit 304 (S102). When the video control unit 305 has already reproduced a part of the video advertisement, it may reproduce the remaining video advertisement or may reproduce the video advertisement from the beginning again.

Subsequently, the viewable area acquisition unit 302 determines whether an operation by the user has been detected through the input device 311 (S104). When the operation by the user has not been detected (No at S104), the viewable area acquisition unit 302 executes the processing at step S104, again.

On the other hand, when the operation by the user has been detected at S104 (Yes at S104), the viewable area acquisition unit 302 acquires positional information on the viewable area from the display control unit 301 and transmits it to the determination unit 304. The reference position acquisition unit 303 acquires pieces of information on the reference positions associated with the display area 102 of the video advertisement from the display control unit 301 and transmits them to the determination unit 304. The determination unit 304 determines whether the viewable area includes the two reference positions 105a and 105b using the positional information on the viewable area and the reference positions associated with the display area 102 of the video advertisement (S106).

When the viewable area includes the two reference positions 105a and 105b (Yes at S106), the viewable area acquisition unit 302 executes the processing at step S104, again. On the other hand, when the viewable area does not include the two reference positions 105a and 105b (No at S106), the determination unit 304 directs the video control unit 305 to stop playback of the video advertisement (S108). Thereafter, the viewable area acquisition unit 302 determines whether an operation by the user has been detected through the input device 311 (S110). When the operation by the user has not been detected (No at S110), the viewable area acquisition unit 302 executes the processing at step S110, again. On the other hand, when the operation by the user has been detected at step S110 (Yes at S110), the determination unit 304 executes the processing at S100, again.

It should be noted that the determination unit 304 can also determine whether the viewable area includes any one reference position of the two reference positions 105a and 105b at S106. In this case, when the viewable area includes any one reference position, the processing at S108 is executed.

The first embodiment has been described above.

As described above, the distribution system 10 in the embodiment can reproduce the video advertisement at the timing at which the area surrounded by the rectangular shape of which diagonal corners are at the two reference positions is desired to be viewed by a browser. Furthermore, the distribution system 10 in the embodiment can reproduce the video advertisement when the viewable area includes the entire display area 102 with the scroll in various directions such as the up-down direction. According to the embodiment, the video image can be reproduced at an appropriate timing.

Second Embodiment

Next, a second embodiment is described with reference to the drawings. In the following description, the same reference numerals as those in the first embodiment denote the configurations having similar or the same functions as those in the first embodiment and description thereof is omitted in some cases.

Configuration of User Terminal 50

Figure 10:
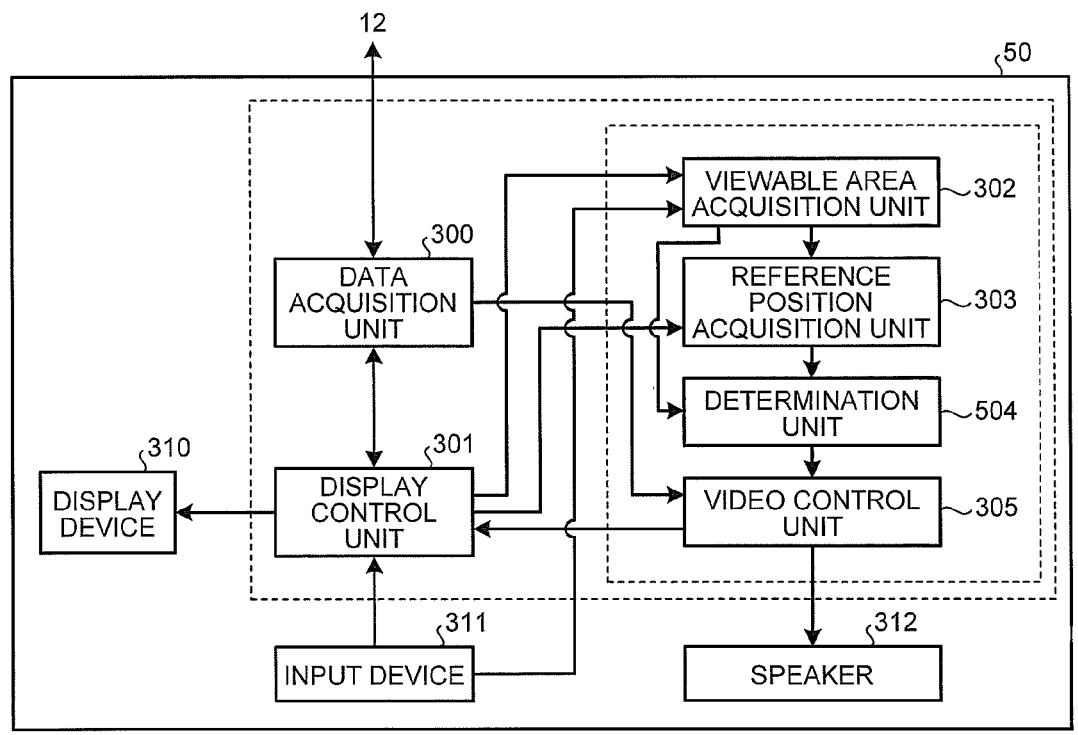
FIG. 10 is a block diagram illustrating an example of the functional configuration of a user terminal according to a second embodiment.

FIG. 10 is a block diagram illustrating an example of the functional configuration of a user terminal in a second embodiment. A user terminal 50 in the embodiment is different from the user terminal 30 in the above-mentioned first embodiment in that the user terminal 50 includes a determination unit 504 instead of the determination unit 304.

Figure 11:
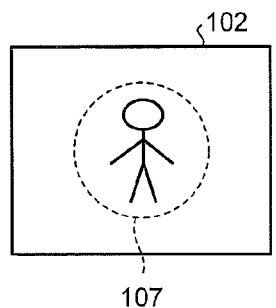
FIG. 11 is a view illustrating an example of a reference position that is used in the second embodiment.

The embodiment is different from the first embodiment in the reference position that is used. FIG. 11 is a view illustrating an example of the reference position that is used in the second embodiment. As illustrated in FIG. 11, in the second embodiment, a circle 107 surrounding a characteristic image in a video advertisement is used as the reference position.

The determination unit 504 determines whether the viewable area includes the display area 102 using the positional information on the viewable area and the reference position 107 associated with the display area 102 of the video advertisement based on the coordinates in the content 100, for example. In the embodiment, when the viewable area includes the reference position 107 associated with the display area 102, the determination unit 504 determines that the viewable area includes the display area 102.

When the determination unit 504 determines that the viewable area does not include the display area 102 using the position of the viewable area and the reference position 107 of the display area 102, it directs the video control unit 305 to stop playback of the video advertisement.

On the other hand, when the determination unit 504 determines that the viewable area includes the display area 102, the determination unit 504 transmits the area ID corresponding to the display area 102 to the video control unit 305.

Operations of User Terminal

Figure 12:
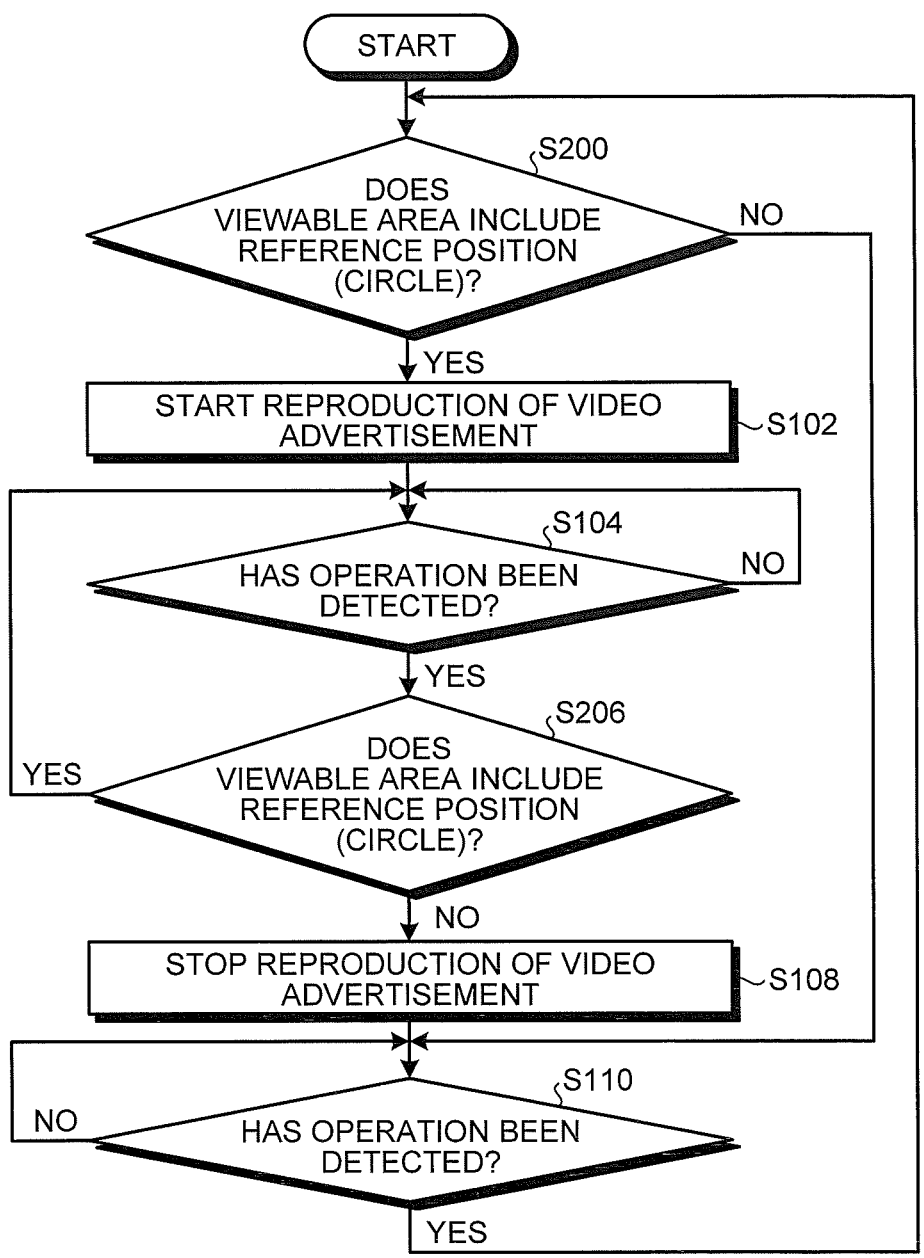
FIG. 12 is a flowchart illustrating an example of operations of the user terminal in the second embodiment.

FIG. 12 is a flowchart illustrating an example of operations of the user terminal in the second embodiment. The user terminal 50 acquires the content data from the distribution device 20 and reads the content control program included in the acquired content data so as to start operations as illustrated in the flowchart.

First, the viewable area acquisition unit 302 acquires the positional information on the viewable area from the display control unit 301 and transmits it to the determination unit 504. The reference position acquisition unit 303 acquires information on the reference position 107 associated with the display area 102 of the video advertisement from the display control unit 301 and transmits it to the determination unit 504. The determination unit 504 determines whether the viewable area includes the reference position 107 using the positional information on the viewable area and the reference position 107 associated with the display area 102 of the video advertisement based on the coordinates in the content 100, for example (S200). When the viewable area does not include the reference position 107 (No at S200), the determination unit 504 executes processing at S110, which will be described later.

When the viewable area includes the reference position 107 (Yes at S200), the determination unit 504 transmits the area ID corresponding to the display area 102 included in the viewable area to the video control unit 305. The video control unit 305 starts playback of the video advertisement data corresponding to the area ID received from the determination unit 504 (S102). When the video control unit 305 has already reproduced a part of the video advertisement, it may reproduce the remaining video advertisement or may reproduce the video advertisement from the beginning again.

Subsequently, the viewable area acquisition unit 302 determines whether an operation by the user has been detected through the input device 311 (S104). When the operation by the user has not been detected (No at S104), the viewable area acquisition unit 302 executes the processing at step S104, again.

On the other hand, when the operation by the user has been detected at step S104 (Yes at S104), the viewable area acquisition unit 302 acquires the positional information on the viewable area from the display control unit 301 and transmits it to the determination unit 504. The reference position acquisition unit 303 acquires the information on the reference position 107 associated with the display area 102 of the video advertisement from the display control unit 301 and transmits it to the determination unit 504. The determination unit 504 determines whether the viewable area includes the reference position 107 using the positional information on the viewable area and the reference position 107 associated with the display area 102 of the video advertisement (S206). In this case, the determination unit 504 may determine whether the viewable area includes the entire reference position 107 or may determine whether the viewable area includes a part of the reference position 107.

When the viewable area includes the reference position 107 (Yes at S206), the viewable area acquisition unit 302 executes the processing at step S104, again. On the other hand, when the viewable area does not include the reference position 107 (No at S206), the determination unit 504 directs the video control unit 305 to stop playback of the video advertisement (S108). Thereafter, the viewable area acquisition unit 302 determines whether an operation by the user has been detected through the input device 311 (S110). When the operation by the user has not been detected (No at S110), the viewable area acquisition unit 302 executes the processing at step S110, again. On the other hand, when the operation by the user has been detected at step S110 (Yes at S110), the determination unit 504 executes the processing at S200, again.

The second embodiment has been described above.

As described above, the distribution system 10 in the embodiment can reproduce the video advertisement at the timing at which the area surrounded by the reference position 107 is desired to be viewed by a browser. According to the embodiment, the video image can be reproduced at an appropriate timing.

Third Embodiment

Next, a third embodiment is described with reference to the drawings. In the following description, the same reference numerals as those in the first embodiment and the second embodiment denote the configurations having similar or the same functions as those in the first embodiment and the second embodiment, and description thereof is omitted in some cases.

Configuration of User Terminal 60

Figure 13:
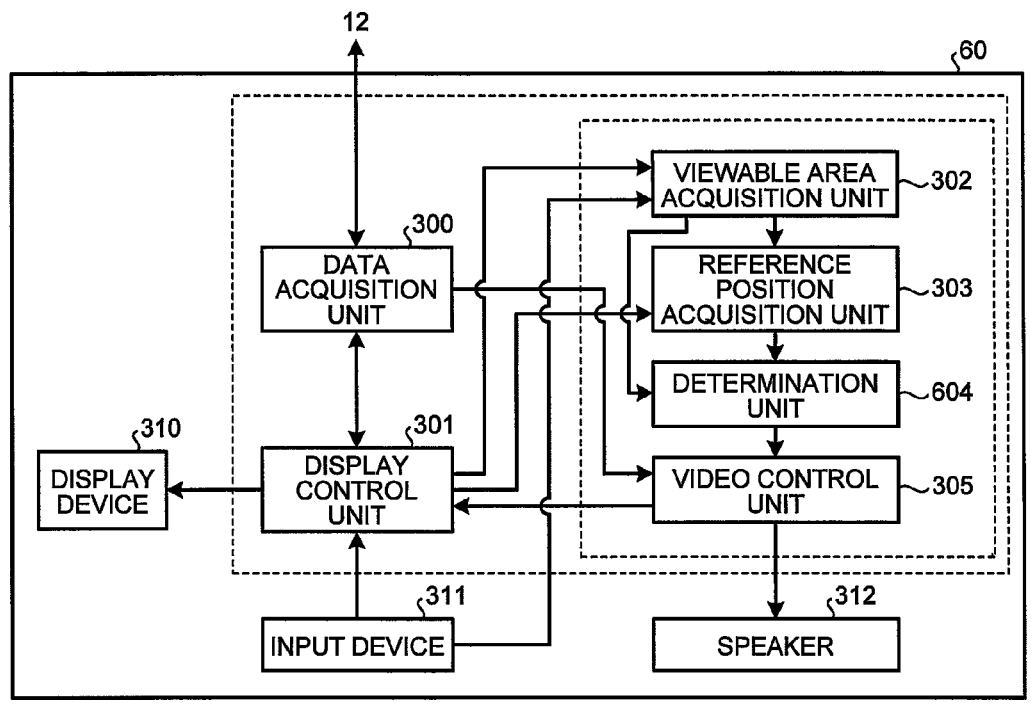
FIG. 13 is a block diagram illustrating an example of the functional configuration of a user terminal according to a third embodiment.

FIG. 13 is a block diagram illustrating an example of the functional configuration of a user terminal in the third embodiment. A user terminal 60 in the embodiment is different from the user terminal 50 in the above-mentioned second embodiment in that the user terminal 60 includes a determination unit 604 instead of the determination unit 504.

Figure 14:
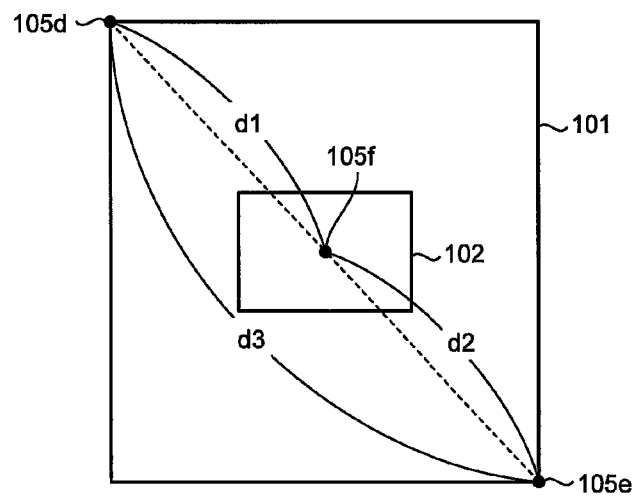
FIG. 14 is a view illustrating an example of a reference position that is used in the third embodiment.

The embodiment is different from the first embodiment and the second embodiment in the method of controlling display of the video advertisement using the reference positions. FIG. 14 is a view illustrating an example of the reference positions that are used in the third embodiment. As illustrated in FIG. 14, two reference positions 105d and 105e are defined on diagonal corners of the viewable area 101 in the third embodiment. In addition, a reference position 105f is defined on the display area 102 in the third embodiment, as illustrated in FIG. 14.

First, the determination unit 604 calculates a distance d1 between the reference position 105d and the reference position 105f using the two reference positions 105d and 105e defined on the viewable area 101 and the reference position 105f associated with the center of the display area 102 of the video advertisement based on the coordinates in the content 100, for example. Then, the determination unit 604 calculates a distance d2 between the reference position 105e and the reference position 105f based on the coordinates in the content 100. The determination unit 604 calculates a distance d3 (d1+d2) as the sum of distance d1 and distance d2. Subsequently, the determination unit 604 determines whether the distance d3 is smaller than a predetermined threshold so as to determine whether the viewable area 101 includes the display area 102. In the embodiment, when the determination unit 604 determines that the distance d3 is smaller than the predetermined threshold, it determines that the viewable area 101 includes the display area 102. An example of the above-mentioned predetermined threshold is described. For example, a value of the distance d3 obtained when the reference position 105d, the reference position 105f, and the reference position 105e are aligned in the horizontal direction (that is, a line connecting the reference position 105d, the reference position 105f, and the reference position 105e is a line dividing the display area 102 into two) can be employed as the predetermined threshold. Furthermore, a value of the distance d3 obtained when the reference position 105d, the reference position 105f, and the reference position 105e are aligned in the perpendicular direction (that is, a line connecting the reference position 105d, the reference position 105f, and the reference position 105e is a line dividing the display area 102 into two) can be employed as the predetermined threshold.

When the determination unit 604 determines that the viewable area 101 does not include the display area 102, it directs the video control unit 305 to stop playback of the video advertisement.

On the other hand, when the determination unit 604 determines that the viewable area 101 includes the display area 102, it transmits the area ID corresponding to the display area 102 to the video control unit 305.

Operations of User Terminal

Figure 15:
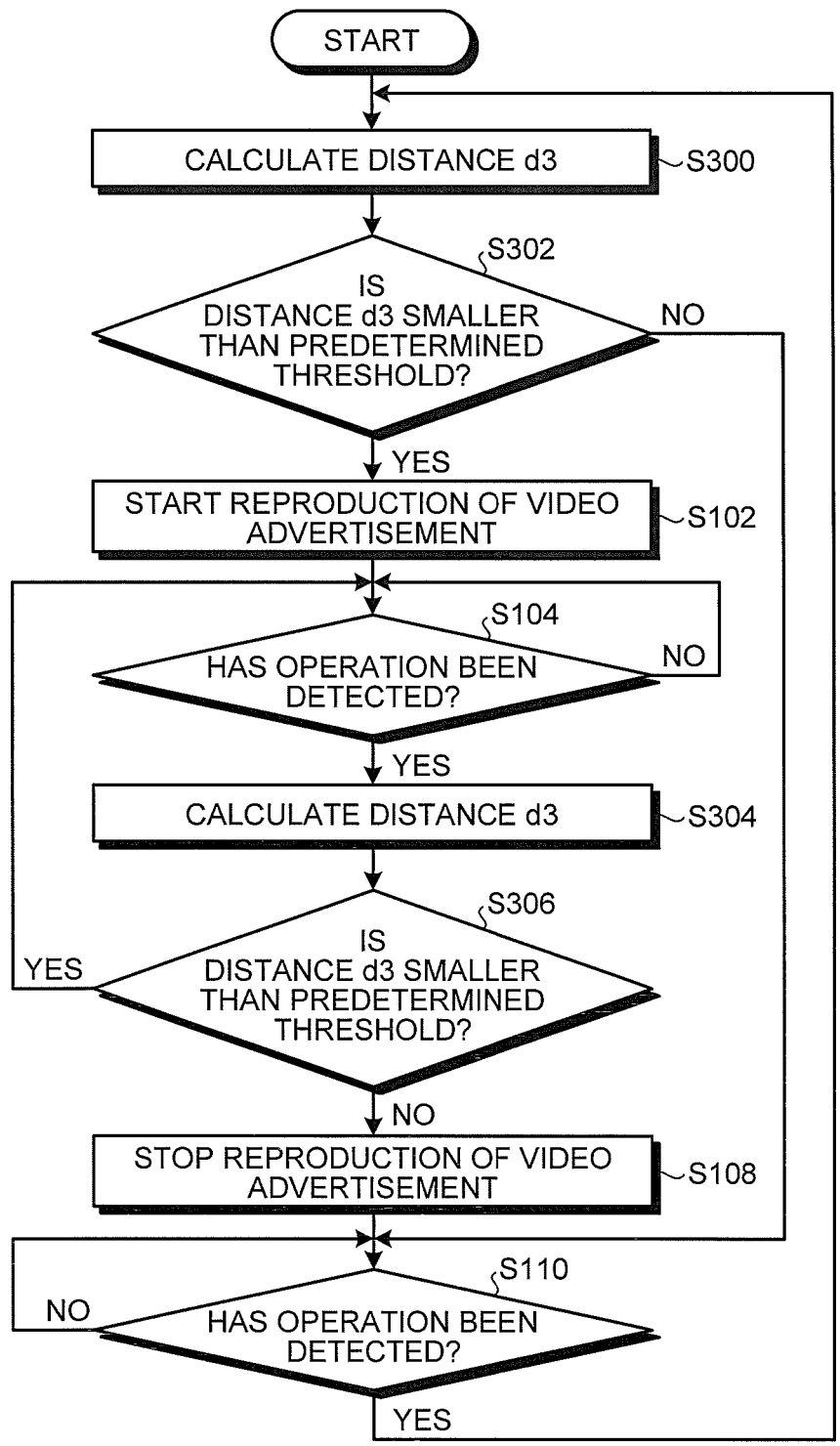
FIG. 15 is a flowchart illustrating an example of operations of the user terminal in the third embodiment.

FIG. 15 is a flowchart illustrating an example of operations of the user terminal in the third embodiment. The user terminal 60 acquires the content data from the distribution device 20 and reads the content control program included in the acquired content data so as to start operations as illustrated in the flowchart.

First, the reference position acquisition unit 303 acquires pieces of information on the reference positions 105d and 105e associated with the viewable area 101 and information on the reference position 105f associated with the display area 102 of the video advertisement from the display control unit 301 and transmits them to the determination unit 604. The determination unit 604 calculates the above-mentioned distance d3 using the reference positions 105d and 105e associated with the viewable area and the reference position 107 associated with the display area 102 of the video advertisement (S300). The determination unit 604 determines whether the calculated distance d3 is smaller than the predetermined threshold (S302). When the calculated distance d3 is not smaller than the predetermined threshold (No at S302), the determination unit 604 executes the processing at step S110, which will be described later.

When the calculated distance d3 is smaller than the predetermined threshold (Yes at S302), the determination unit 604 transmits the area ID corresponding to the display area 102 to the video control unit 305. The video control unit 305 starts playback of the video advertisement data corresponding to the area ID received from the determination unit 604 (S102). When the video control unit 305 has already reproduced a part of the video advertisement, it may reproduce the remaining video advertisement or may reproduce the video advertisement from the beginning again.

Subsequently, the viewable area acquisition unit 302 determines whether an operation by the user has been detected through the input device 311 (S104). When the operation by the user has not been detected (No at S104), the viewable area acquisition unit 302 executes the processing at step S104, again.

On the other hand, when the operation by the user has been detected at S104 (Yes at S104), the reference position acquisition unit 303 acquires the pieces of information on the reference positions 105d and 105e associated with the viewable area 101 and the information on the reference position 105f associated with the display area 102 of the video advertisement from the display control unit 301 and transmits them to the determination unit 604. The determination unit 604 calculates the above-mentioned distance d3 using the reference positions 105d and 105e associated with the viewable area and the reference position 107 associated with the display area 102 of the video advertisement (S304). Then, the determination unit 604 determines whether the calculated distance d3 is smaller than the predetermined threshold (S306).

When the calculated distance d3 is smaller than the predetermined threshold (Yes at S306), the viewable area acquisition unit 302 executes the processing at step S104, again. On the other hand, when the calculated distance d3 is not smaller than the predetermined threshold (No at S306), the determination unit 604 directs the video control unit 305 to stop playback of the video advertisement (S108). Thereafter, the viewable area acquisition unit 302 determines whether an operation by the user has been detected through the input device 311 (S110). When the operation by the user has not been detected (No at S110), the viewable area acquisition unit 302 executes the processing at step S110, again. On the other hand, when the operation by the user has been detected at step S110 (Yes at S110), the determination unit 604 executes the processing at S300, again.

The third embodiment has been described above.

As described above, the distribution system 10 in the embodiment can reproduce the video advertisement at the timing at which the distance d3 is smaller than the predetermined threshold. According to the embodiment, the video image can be reproduced at an appropriate timing by setting the predetermined threshold to a value with which the video image can be reproduced at the appropriate timing.

Fourth Embodiment

Next, a fourth embodiment is described with reference to the drawings. In the following description, the same reference numerals as those in the first embodiment to the third embodiment denote the configurations having similar or the same functions as those in the first embodiment to the third embodiment, and description thereof is omitted in some cases.

Configuration of User Terminal 70

Figure 16:
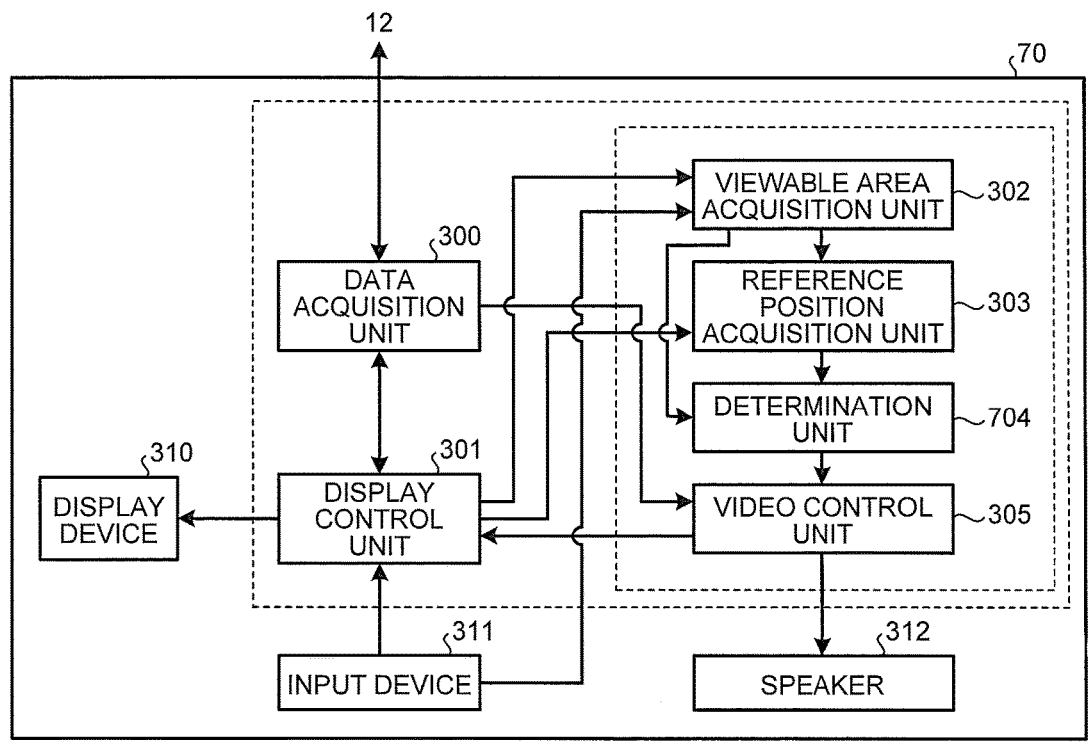
FIG. 16 is a block diagram illustrating an example of the functional configuration of a user terminal according to a fourth embodiment.

FIG. 16 is a block diagram illustrating an example of the functional configuration of a user terminal in a fourth embodiment. A user terminal 70 in the embodiment is different from the user terminal 60 in the above-mentioned third embodiment in that the user terminal 70 includes a determination unit 704 instead of the determination unit 604.

Figure 17:
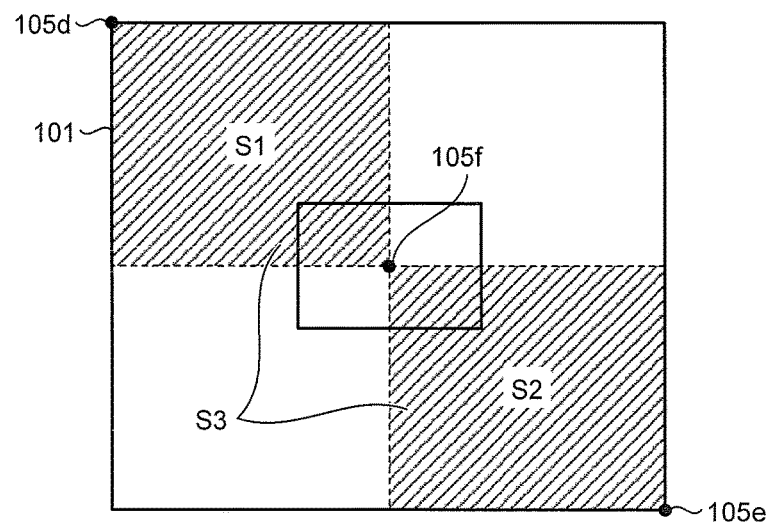
FIG. 17 is a view illustrating an example of a reference position that is used in the fourth embodiment.

The embodiment is different from the third embodiment in the method of controlling display of the video advertisement using the reference positions. FIG. 17 is a view illustrating an example of the reference positions that are used in the fourth embodiment. In the fourth embodiment, as illustrated in FIG. 17, the two reference positions 105d and 105e are defined on the diagonal corners of the viewable area 101 as in the third embodiment. In addition, in the fourth embodiment, the reference position 105f is defined on the display area 102 as in the third embodiment, as illustrated in FIG. 14.

The determination unit 704 calculates an area S1 of a rectangular shape of which diagonal corners are at the reference position 105d and the reference position 105f using the two reference positions 105d and 105e defined on the viewable area 101 and the reference position 105f associated with the display area 102 of the video advertisement based on the coordinates in the content 100, for example. Then, the determination unit 704 calculates an area S2 of a rectangular shape of which diagonal corners are at the reference position 105e and the reference position 105f based on the coordinates in the content 100. The determination unit 704 calculates an area S3 (S1+S2) as the sum of area S1 and area S2. Subsequently, the determination unit 704 determines whether the area S3 is smaller than a predetermined threshold so as to determine whether the viewable area 101 includes the display area 102. In the embodiment, when the area S3 is smaller than the predetermined threshold, the determination unit 704 determines the viewable area 101 includes the display area 102.

When the determination unit 704 determines that the viewable area 101 does not include the display area 102, it directs the video control unit 305 to stop playback of the video advertisement.

On the other hand, when the determination unit 704 determines that the viewable area 101 includes the display area 102, it transmits the area ID corresponding to the display area 102 to the video control unit 305.

Operations of User Terminal

Figure 18:
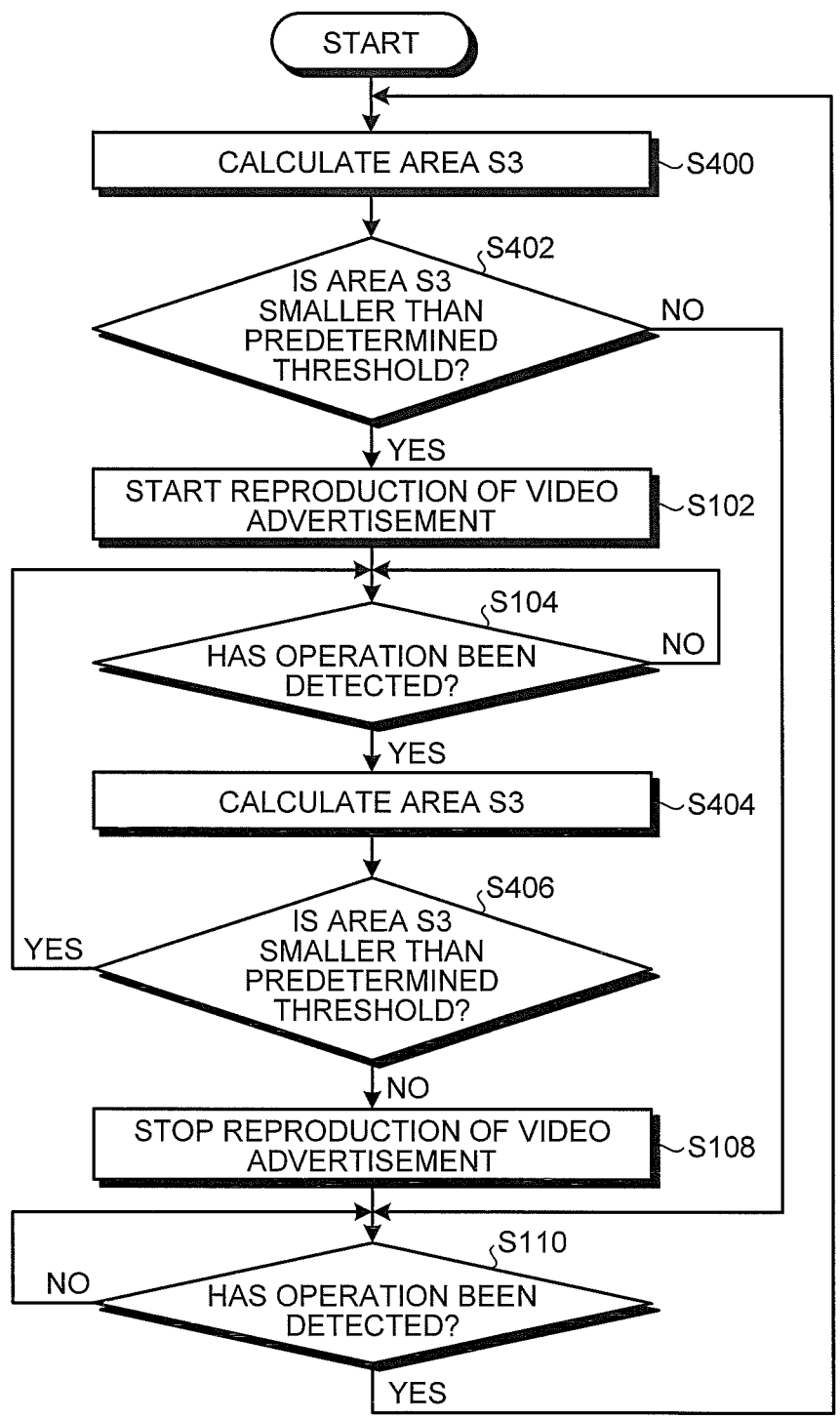
FIG. 18 is a flowchart illustrating an example of operations of the user terminal in the fourth embodiment.

FIG. 18 is a flowchart illustrating an example of operations of the user terminal in the fourth embodiment. The user terminal 70 acquires the content data from the distribution device 20 and reads the content control program included in the acquired content data so as to start operations as illustrated in the flowchart.

First, the reference position acquisition unit 303 acquires pieces of information on the reference positions 105d and 105e associated with the viewable area 101 and information on the reference position 105f associated with the display area 102 of the video advertisement from the display control unit 301 and transmits them to the determination unit 704. The determination unit 704 calculates the above-mentioned area S3 using the reference positions 105d and 105e associated with the viewable area and the reference position 107 associated with the display area 102 of the video advertisement (S400). Then, the determination unit 704 determines whether the calculated area S3 is smaller than the predetermined threshold (S402). When the calculated area S3 is not smaller than the predetermined threshold (No at S402), the determination unit 704 executes the processing at step S110, which will be described later.

When the calculated area S3 is smaller than the predetermined threshold (Yes at S402), the determination unit 704 transmits the area ID corresponding to the display area 102 to the video control unit 305. The video control unit 305 starts playback of the video advertisement data corresponding to the area ID received from the determination unit 704 (S102). When the video control unit 305 has already reproduced a part of the video advertisement, it may reproduce the remaining video advertisement or may reproduce the video advertisement from the beginning again.

Subsequently, the viewable area acquisition unit 302 determines whether an operation by the user has been detected through the input device 311 (S104). When the operation by the user has not been detected (No at S104), the viewable area acquisition unit 302 executes the processing at step S104, again.

On the other hand, when the operation by the user has been detected at S104 (Yes at S104), the reference position acquisition unit 303 acquires the pieces of information on the reference positions 105$d$ and 105$e$ associated with the viewable area 101 and the information on the reference position 105$f$ associated with the display area 102 of the video advertisement from the display control unit 301 and transmits them to the determination unit 704. The determination unit 704 calculates the above-mentioned area S3 using the reference positions 105$d$ and 105$e$ associated with the viewable area and the reference position 107 associated with the display area 102 of the video advertisement (S404). Then, the determination unit 704 determines whether the calculated area S3 is smaller than the predetermined threshold (S406).

When the calculated area S3 is smaller than the predetermined threshold (Yes at S406), the viewable area acquisition unit 302 executes the processing at step S104, again. On the other hand, when the calculated area S3 is not smaller than the predetermined threshold (No at S406), the determination unit 704 directs the video control unit 305 to stop playback of the video advertisement (S108). Thereafter, the viewable area acquisition unit 302 determines whether an operation by the user has been detected through the input device 311 (S110). When the operation by the user has not been detected (No at S110), the viewable area acquisition unit 302 executes the processing at step S110, again. On the other hand, when the operation by the user has been detected at step S110 (Yes at S110), the determination unit 704 executes the processing at S400, again.

The fourth embodiment has been described above.

As described above, the distribution system 10 in the embodiment can reproduce the video advertisement at the timing at which the area S3 is smaller than the predetermined threshold. According to the embodiment, the video image can be reproduced at an appropriate timing by setting the predetermined threshold to a value at which the video image can be reproduced at the appropriate timing.

The video control unit 305 in the above-mentioned first embodiment to fourth embodiment can also control whether the video advertisement is displayed in consideration of an overlapping degree of contents that are displayed on the display device 310. FIG. 19 is a view illustrating an example in the case where another content is displayed on the display area 102 of the video advertisement in an overlapped manner. For example, as illustrated in FIG. 19, when another content 400 is displayed on the display area 102 of the video advertisement in an overlapped manner in the viewable area 101, the video control unit 305 can control the video image so as not to start playback of the video image. This can prevent generation of a state where the video image is reproduced although a browser can hardly grasp contents of the video image.

The video control unit 305 can start playback of the video image even when another content 400 is displayed on the display area 102 of the video advertisement in the overlapped manner in the viewable area 101. The playback of the video image is started in order to attract a browser's attention and cause the browser to set the video image at the uppermost position on the screen and browse the video image. In this case, the determination unit in the above-mentioned first embodiment to fourth embodiment can change the type of the reference point in accordance with the number of contents located on the display area 102. FIGS. 20A and 20B are views for explaining processing when the type of the reference points is changed. For example, as illustrated in FIG. 20A, when one content 400 is overlapped on the display area 102, the determination unit performs the above-mentioned processing using the reference points as illustrated in FIG. 8A, for example. On the other hand, as illustrated in FIG. 20B, when two contents 400 and 401 are overlapped on the display area 102, the determination unit performs the above-mentioned processing using the reference points as illustrated in FIG. 8B, for example.

Figure 21:
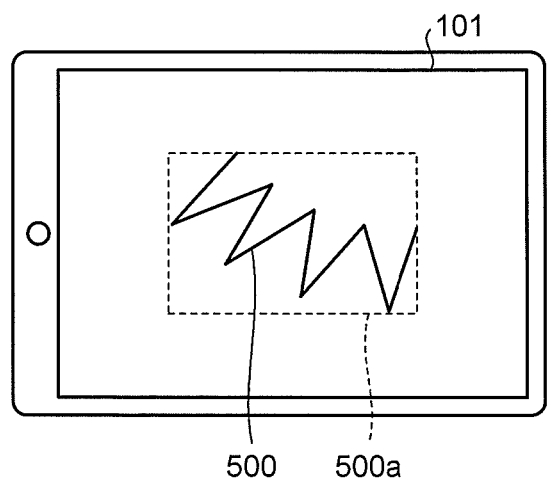
FIG. 21 is a view for explaining another example of a movement trajectory.

In addition, in the above-mentioned first embodiment to fourth embodiment, as illustrated in FIG. 21, the viewable area can be set to a rectangular shape 500$a$ surrounding a movement trajectory 500 of a pointer on the screen. It should be noted that the browser operates a mouse so as to move the pointer. The pointer is moved on an area that is viewed by the browser frequently on the screen of the user terminal 30 in many cases. In view of this, a range that is viewed by the browser frequently can be set to the viewable area by setting the rectangular shape 500$a$ surrounding the movement trajectory 500 of the pointer to the viewable area.

Figure 22:
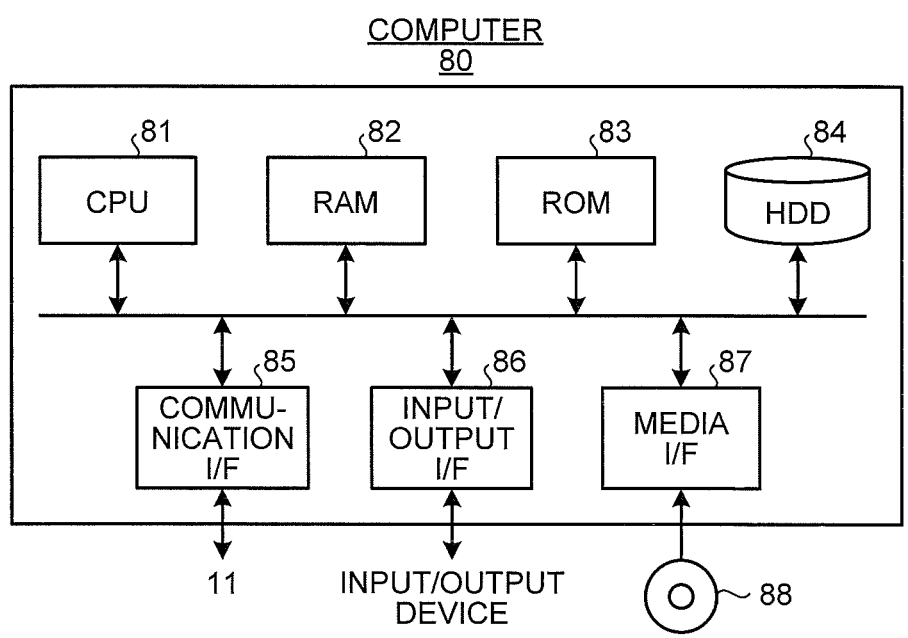
FIG. 22 is a hardware configuration diagram illustrating an example of a computer that executes functions of a distribution device.

The distribution device 20 in the first embodiment to fourth embodiment is made to function by a computer 80 having the configuration as illustrated in FIG. 22, for example. FIG. 22 is a hardware configuration diagram illustrating an example of the computer that executes the functions of the distribution device. The computer 80 includes a central processing unit (CPU) 81, a random access memory (RAM) 82, a read only memory (ROM) 83, a hard disk drive (HDD) 84, a communication interface (I/F) 85, an input/output interface (I/F) 86, and a media interface (I/F) 87.

The CPU 81 operates based on programs stored in the ROM 83 or the HDD 84 so as to control the respective components. The ROM 83 stores therein a boot program that is executed by the CPU 81 when the computer 80 is activated, a program depending on the hardware of the computer 80, and the like.

The HDD 84 stores therein the program that is executed by the CPU 81 and data that is used by the program. The communication interface 85 receives data from another device through the communication circuit 11 and transmits it to the CPU 81, and transmits the data generated by the CPU 81 to another device through the communication circuit 11.

The CPU 81 controls an output device such as a display and a printer and an input device such as a keyboard and a mouse through the input/output interface 86. The CPU 81 acquires the data from the input device through the input/output interface 86. Furthermore, the CPU 81 outputs the generated data to the output device through the input/output interface 86.

The media interface 87 reads a program or data stored in a recording medium 88 and provides it to the CPU 81 through the RAM 82. The CPU 81 loads the program on the RAM 82 from the recording medium 88 through the media interface 87 and executes the loaded program. The recording medium 88 is an optical recording medium such as a digital versatile disc (DVD) and a phase change rewritable disc (PD), a magneto-optical recording medium such as a magneto-optical disc (MO), a tape medium, a magnetic recording medium, a semiconductor memory, or the like.

When the computer 80 functions as the distribution device 20 in the first embodiment to fourth embodiment, the CPU 81 of the computer 80 executes programs loaded on the RAM 82 so as to execute the respective functions of the content data storage unit 21 and the distribution unit 22. Furthermore, the HDD 84 stores therein pieces of data in the content data storage unit 21.

The CPU 81 of the computer 80 reads the programs from the recording medium 88 and executes them. As another example, the CPU 81 of the computer 80 may acquire the programs from another device through the communication circuit 11.

In the distribution device 20 in the first embodiment to fourth embodiment, the CPU in the user terminal 30 reads the content control programs included in the respective contents stored in the content data storage unit 21, so that the user terminal 30 executes the respective functions of the viewable area acquisition unit 302, the reference position acquisition unit 303, the determination unit 304, and the video control unit 305.

Furthermore, although the determination unit 304, 504, 604, or 704 determines whether the viewable area includes the display area of the video advertisement in the above-mentioned respective embodiments, the functions of the determination unit may be provided in the distribution device 20.

For example, the display control unit 301 transmits the area ID of the display area 102 of the video advertisement in the content 100 and the information on the reference position of the display area 102 to the distribution device 20 through the communication circuit 11. The viewable area acquisition unit 302 transmits the acquired positional information on the viewable area to the distribution device 20 through the communication circuit 11.

Then, the determination unit provided in the distribution device 20 determines whether the viewable area includes the display area 102 using the positional information on the viewable area and the reference position associated with the display area 102 of the video advertisement. When the determination unit in the distribution device 20 determines that the viewable area includes the display area 102, it transmits the area ID corresponding to the display area 102 included in the viewable area to the video control unit 305 through the communication circuit 11. On the other hand, when the determination unit in the distribution device 20 determines that the viewable area does not include the display area 102, it directs the video control unit 305 to stop playback of the video advertisement through the communication circuit 11.

In this case, the determination unit is provided in the distribution device 20 in addition to the content data storage unit 21 and the distribution unit 22. Alternatively, the determination unit may be provided in a device different from the distribution device 20. In this case, the distribution device 20 may be managed by a media company such as a newspaper company and another device provided with the determination unit may be managed by an advertisement distributor or the like.

According to the invention, a video image can be reproduced at an appropriate timing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A distribution device comprising:
a processor programmed to distribute, to a user terminal, a content control program that controls content displayed on the user terminal, the content control program causing the user terminal to execute:
acquiring, as information on a viewable area, information on an area of the content displayed by a browser program;
acquiring information on a plurality of reference positions defined on a display area of the content on which a video image is displayed;
determining whether the plurality of reference positions are located in the viewable area;
starting playback of the video image when a predetermined number of the plurality of reference positions are determined to be located in the viewable area;
in response to a scroll operation causing the display area of the content displayed in the browser program to move relative to the viewable area, determining whether any one of the predetermined number of the plurality of reference positions is not located in the viewable area; and
after starting playback of the video image, stopping playback of the video image in response to any one of the predetermined number of the plurality of reference positions being determined to not be located in the viewable area due to the scroll operation causing the display area of the content displayed in the browser program to move relative to the viewable area.

2. The distribution device according to claim 1, wherein the content control program causes the user terminal to:
acquire information on two reference positions located at diagonal corners of the display area having a rectangular shape; and
determine whether the acquired two reference positions are located in the viewable area.

3. The distribution device according to claim 1, wherein the content control program causes the user terminal to:
acquire information on two reference positions located at diagonal corners of a rectangular shape surrounding an area displaying a characteristic image in the display area; and
determine whether the acquired two reference positions are located in the viewable area.

4. The distribution device according to claim 1, wherein the content control program causes the user terminal to acquire, as the information on the viewable area, information on an area displayed on a screen of the user terminal in the area displayed by the browser program.

5. The distribution device according to claim 1, wherein playback of the video image is not started when the content and another content are displayed on a screen of the user terminal in an overlapped manner, and the other content is displayed on the content.

6. The distribution device according to claim 1, wherein the viewable area is an area surrounding a trajectory of a pointer on a screen of the user terminal.

7. A distribution device comprising:
a processor programmed to distribute, to a user terminal, a content control program that controls content displayed on the user terminal, the content control program causing the user terminal to execute:

acquiring, as information on a viewable area, information on a content area of the content displayed by a browser program;

acquiring positional information on a characteristic image area displaying a characteristic image that is located within a display area on which a video image is displayed, the positional information including a plurality of reference positions located at an outer periphery of the characteristic image area displaying the characteristic image, the plurality of reference positions being located at different horizontal and vertical positions relative to each other and the video image;

in response to a scroll operation causing the display area of the content displayed in the browser program to move relative to the viewable area, determining whether all of the plurality of reference positions of the characteristic image area displaying the characteristic image are located in the viewable area; and starting playback of the video image in response to determining that all of the plurality of reference positions of the characteristic image area displaying the characteristic image are located in the viewable area.

8. The distribution device according to claim 7, wherein the content control program causes the user terminal to acquire, as the information on the viewable area, information on an area displayed on a screen of the user terminal in the area displayed by the browser program.

9. The distribution device according to claim 7, wherein playback of the video image does not start when the content and another content are displayed on a screen of the user terminal in an overlapped manner, and the other content is displayed on the content.

10. The distribution device according to claim 7, wherein the viewable area is an area surrounding a trajectory of a pointer on a screen of the user terminal.

11. A distribution method causing a computer to execute distributing, to a user terminal, a content control program that controls content displayed on the user terminal, the content control program causing the user terminal to execute:

acquiring, as information on a viewable area, information on an area of the content displayed by a browser program;

acquiring information on a plurality of reference positions defined on a display area of the content on which a video image is displayed;

determining whether the plurality of reference positions are located in the viewable area;

starting playback of the video image when a predetermined number of the plurality of reference positions are determined to be located in the viewable area;

in response to a scroll operation causing the display area of the content displayed in the browser program to move relative to the viewable area, determining whether any one of the predetermined number of the plurality of reference positions is not located in the viewable area; and after starting playback of the video image, stopping playback of the video image in response to any one of the predetermined number of the plurality of reference positions being determined not to be located in the viewable area due to the scroll operation causing the display area of the content displayed in the browser program to move relative to the viewable area.

12. A distribution method causing a computer to execute distributing a content including a content control program to a user terminal, the content control program causing the user terminal to execute:

acquiring, as information on a viewable area, information on a content area of the content displayed by a browser program;

acquiring positional information on a characteristic image area displaying a characteristic image that is located within a display area on which a video image is displayed, the positional information including a plurality of reference positions located at an outer periphery of the characteristic image area displaying the characteristic image, the plurality of reference positions being located at different horizontal and vertical positions relative to each other and the video image;

in response to a scroll operation causing the display area of the content displayed in the browser program to move relative to the viewable area, determining whether all of the plurality of reference positions of the characteristic image area displaying the characteristic image are located in the viewable area; and starting playback of the video image in response to determining that all of the plurality of reference positions of the characteristic image area displaying the characteristic image are located in the viewable area.

13. A non-transitory computer-readable storage medium with an executable program stored thereon, the program causing a computer to execute a procedure distributing a content including a content control program to a user terminal, the content control program causing the user terminal to execute:

acquiring, as information on a viewable area, information on an area of the content displayed by a browser program;

acquiring information on a plurality of reference positions defined on a display area of the content on which a video image is displayed;

determining whether the plurality of reference positions are located in the viewable area;

starting playback of the video image when a predetermined number of the plurality of reference positions are determined to be located in the viewable area;

in response to a scroll operation causing the display area of the content displayed in the browser program to move relative to the viewable area, determining whether any one of the predetermined number of the plurality of reference positions is not located in the viewable area; and after starting playback of the video image, stopping playback of the video image in response to any one of the predetermined number of the plurality of reference positions being determined to not be located in the viewable area due to the scroll operation causing the display area of the content displayed in the browser program to move relative to the viewable area.

14. A non-transitory computer-readable storage medium with an executable program stored thereon, the program causing a computer to execute a procedure distributing a content including a content control program to a user terminal, the content control program causing the user terminal to execute:

acquiring, as information on a viewable area, information on a content area of the content displayed by a browser program;

acquiring positional information on a characteristic image area displaying a characteristic image that is located within a display area on which a video image is displayed, the positional information including a plurality of reference positions located at an outer periphery of the characteristic image area displaying the characteristic image, the plurality of reference positions being located at different horizontal and vertical positions relative to each other and the video image;

in response to a scroll operation causing the display area of the, content displayed in the browser program to move relative to the viewable area, determining whether all of the plurality of reference positions of the characteristic image area displaying the characteristic image are located in the viewable area; and starting playback of the video image in response to determining that all of the plurality of reference positions of the characteristic image area displaying the characteristic image are located in the viewable area.

* * * * *